(12) United States Patent
Dunn et al.

(10) Patent No.: US 10,801,883 B2
(45) Date of Patent: Oct. 13, 2020

(54) APPARATUS AND METHODS FOR HIGH-SPEED MARKING OF OPTICAL FIBERS

(71) Applicant: CORNING INCORPORATED, Corning, NY (US)

(72) Inventors: Steven Howard Dunn, Wilmington, NC (US); Aditya Kaimal, Wilmington, NC (US); Kelvin Nguyen, Fort Worth, TX (US); Krishna Prasad Ambuga Keshavamurthy, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/554,005

(22) Filed: Aug. 28, 2019

(65) Prior Publication Data
US 2020/0088567 A1    Mar. 19, 2020

Related U.S. Application Data

(60) Provisional application No. 62/733,231, filed on Sep. 19, 2018.

(51) Int. Cl.
*G01H 9/00* (2006.01)
*G02B 6/44* (2006.01)

(52) U.S. Cl.
CPC .......... *G01H 9/004* (2013.01); *G02B 6/4415* (2013.01)

(58) Field of Classification Search
CPC .............................. G02B 6/4415; G01H 9/004
(Continued)

(56) References Cited

U.S. PATENT DOCUMENTS 4,629,285 A    12/1986 Carter et al.
4,881,489 A    11/1989 Klebl et al.
(Continued)

FOREIGN PATENT DOCUMENTS

CN    205080288 U    3/2016
CN    103273312 B    4/2016
(Continued)

OTHER PUBLICATIONS

International Search Report and Written Opinion of the European International Searching Authority; PCT/US2019/049449; dated Dec. 10, 2019; European Patent Office; 14 Pgs.
(Continued)

*Primary Examiner* — Jerry M Blevins
(74) *Attorney, Agent, or Firm* — Kevin L. Bray

(57) ABSTRACT

The apparatus and methods include moving an optical fiber over a fiber path that includes a marking location at which resides a printer unit. The moving optical fiber has an amount of undamped fiber vibration that can exceed a fiber vibration tolerance at high fiber speeds. The printer unit is configured to dispense ink onto the optical fiber to form wet ink marks along the optical fiber as it moves past the marking location. The wet ink marks are dried and counted for quality control. The marked optical fiber is then covered with an overcoat to protect the ink marks. A position sensor measures an amount of vibration of the optical fiber substantially at the marking location. One or more vibration dampers disposed along the fiber path are used to reduce the fiber vibration below the fiber vibration tolerance. This allows for high-speed marking of the optical fiber.

20 Claims, 12 Drawing Sheets

(58) Field of Classification Search
USPC .......................................................... 385/12
See application file for complete search history.

(56) References Cited

U.S. PATENT DOCUMENTS

| | | | |
|---|---|---|---|
| 5,042,899 A | | 8/1991 | Le Compte |
| 5,119,464 A | * | 6/1992 | Freychet ............... C03C 25/104 347/2 |
| 5,377,292 A | | 12/1994 | Bartling et al. |
| 5,796,905 A | | 8/1998 | Hoffart et al. |
| 6,360,044 B1 | | 3/2002 | Mills et al. |
| 6,404,972 B1 | | 6/2002 | Pasch et al. |
| 6,576,591 B1 | | 6/2003 | Snowdon et al. |
| 6,650,815 B2 | | 11/2003 | Hawtof et al. |
| 7,072,554 B2 | | 7/2006 | Watanabe et al. |
| 8,573,008 B2 | | 11/2013 | Faler et al. |
| 8,768,128 B1 | | 7/2014 | Gamer et al. |
| 8,973,408 B2 | | 3/2015 | Filippov et al. |
| 2001/0048797 A1 | * | 12/2001 | Van Dijk ............... G02B 6/4482 385/114 |
| 2009/0139270 A1 | | 6/2009 | Filippov et al. |
| 2011/0289979 A1 | | 12/2011 | Faler et al. |
| 2015/0192748 A1 | | 7/2015 | Sato et al. |
| 2015/0352861 A1 | * | 12/2015 | Yagi ....................... B41J 3/4073 347/85 |
| 2019/0219783 A1 | * | 7/2019 | Ly ......................... G02B 6/3873 |
| 2020/0064550 A1 | * | 2/2020 | Sato ....................... G02B 6/443 |
| 2020/0072311 A1 | * | 3/2020 | Li .......................... G02B 6/4401 |

FOREIGN PATENT DOCUMENTS

| | | |
|---|---|---|
| DE | 3208172 A1 | 9/1983 |
| FR | 2509275 A1 | 1/1983 |
| JP | 63195610 A | 8/1988 |
| JP | 11326714 A | 11/1999 |
| JP | 2000159536 A | 6/2000 |
| JP | 2000247688 A | 9/2000 |
| JP | 2004157193 A | 6/2004 |
| JP | 2016206211 A | 12/2016 |

OTHER PUBLICATIONS

Sharma et al; "A Review of the Development in the Field of Fiber Optic Communication Systems." International Journal of Emerging Technology and Advanced Engineering; Journal 3, No. 5; (2013); pp. 113-119.

Westwind Air Bearing Spindles; "Air Bearing Technology."; Celera Motion; 2 pages; 2019 www.westwind-airbearings.com.

* cited by examiner

US 10,801,883 B2

APPARATUS AND METHODS FOR HIGH-SPEED MARKING OF OPTICAL FIBERS

This application claims the benefit of priority to U.S. Provisional Application Ser. No. 62/733,231 filed on Sep. 19, 2018, the content of which is relied upon and incorporated herein by reference in its entirety.

FIELD

The present disclosure relates to optical fibers, and in particular relates to apparatus and methods for high-speed marking of optical fibers.

BACKGROUND

Optical fiber cables are used extensively in optical telecommunications systems. Certain types of optical fiber cables used for transmitting large amounts of data include many individual optical fibers, with the fiber count ranging from just a few to hundreds, depending on the particular application. This requires a coding scheme so that the individual optical fibers can be identified. Such coding schemes can include fiber color or individualized markings on the outer surface of the optical fibers.

A problem with color-based coding schemes is that there are not enough colors for effectively color coding more than about eighteen optical fibers. A problem with marking the outer surface of optical fibers is that the markings can wear off over time by normal wear and tear and by manual handling by field workers. Another problem with marking the outer surface of optical fibers is that present-day methods and apparatus used to perform the marking are relatively slow. The slowness is due in part to the vibration of the optical fiber that occurs when attempting to move the optical fibers at relatively high speeds through the marking apparatus. Such vibration makes it difficult if not impossible to mark the optical fibers with the consistency required for useful coding schemes.

SUMMARY

The apparatus and methods disclosed herein generally include moving an optical fiber over a fiber path that includes a marking location at which resides a printer unit. The moving optical fiber has an amount of undamped fiber vibration that can at high speeds exceed a fiber vibration tolerance beyond which marking the optical fiber becomes problematic. The printer unit is configured to dispense ink onto the optical fiber to form wet ink marks along the optical fiber as it moves past the marking location. The wet ink marks are dried and counted for quality control. The marked optical fiber is then coated to protect the ink marks. A position sensor measures an amount of vibration of the optical fiber substantially at the marking location. One or more vibration dampers disposed along the fiber path are used to reduce the fiber vibration below the fiber vibration tolerance.

An embodiment of the disclosure is a method of marking an optical fiber having an outer surface. The method comprises: moving the optical fiber past a printer unit configured to dispense ink, wherein the moving optical fiber has an amount of undamped vibration substantially at the ink-jet printer head; damping the undamped vibration of the moving optical fiber to define an amount of damped vibration of the moving optical fiber substantially at the printer unit; dispensing the ink from the printer unit onto the outer surface of the moving optical fiber to form spaced apart wet ink marks; drying the wet ink marks to form dry ink marks; and forming a substantially transparent protective coating over the outer surface of the optical fiber and over the marks.

Another embodiment of the disclosure is a method of marking an optical fiber having an outer surface. The method comprises: moving an optical fiber at a line speed greater than 2 m/s past a printer unit, the printer unit dispensing ink to the outer surface of the optical fiber, the ink contacting the outer surface of the optical fiber at a marking location, the optical fiber having a vibration in a direction that displaces the optical fiber away from the marking location; and damping the vibration of the optical fiber, the damping including controlling the vibration to have a peak-to-peak displacement less than 40 µm.

In an example of the method, the printer unit comprises one or more ink-jet printer heads used to dispense the ink. Also in an example, the mark can comprise a patterned mark, as described below.

In another example, the method is carried out in an optical fiber marking apparatus and further comprises: measuring a number density of the wet or dry ink marks per unit length; comparing the measured number density to a number density tolerance; and making at least one adjustment to the optical fiber marking apparatus if the measured number density is outside of the number density tolerance.

Another embodiment of the disclosure is a method of marking an optical fiber. The method comprises: causing the optical fiber to move over a fiber path, wherein the moving optical fiber has an outer surface and an amount of undamped vibration in the absence of vibration damping; performing vibration damping by passing the moving optical fiber through at least a first vibration damper respectively operably disposed in the fiber path adjacent an ink-jet printer head and configured to physically contact the optical fiber to provide, substantially at the ink-jet printer head, an amount of damped vibration that is smaller than the amount of undamped vibration and that is within a vibration tolerance; printing on the moving optical fiber a select number density of ink marks per unit length on the outer surface of the optical fiber with ink from the ink-jet printer head; drying the ink marks at a drying location to form dried ink marks; and applying a substantially transparent protective coating over the dried ink marks and the outer surface of the moving optical fiber, wherein the dried ink marks are visible through the substantially transparent protective coating. In an example, the substantially transparent coating is colored.

Another embodiment of the disclosure is a high-speed optical fiber marking apparatus for marking an optical fiber having an outside surface and comprising relative to a fiber path: a payout module and a take-up module respectively configured to pay out and take up the optical fiber while moving the optical fiber over the fiber path at a fiber speed that gives rise to an amount of undamped fiber vibration that exceeds a fiber vibration tolerance at a marking location in the absence of vibration damping; a printer unit disposed downstream of the payout module and at the marking location, the printer unit configured to dispense ink to form ink marks on the outside surface of the moving optical fiber; a position sensor disposed downstream of the printer unit and configured to measure an amount of vibration in the optical fiber in the vicinity of the printer unit; a dryer unit disposed downstream of the position sensor at a drying location and configured to dry the ink marks to form dried ink marks; a coating system disposed downstream of the drying location and configured to coat the outer surface and the dried ink marks; and at least one vibration damper operably disposed in the fiber path and configured to perform vibration damping that reduces the amount of undamped fiber vibration to an amount of damped fiber vibration that is less than the fiber vibration tolerance.

In an example, the printer unit can comprise one or more ink-jet printer heads configured to dispense the ink.

In another example, the at least first vibration damper comprises first and second spaced apart guide members that define a guide member gap through which the optical fiber passes, with the guide members having respective outer surfaces that contact opposite sides of the optical fiber. In an example, the guide members are configured to rotate, while in another example the guide members do not rotate, i.e., are not rotatable.

In another example, the apparatus also comprises a second vibration damper operably disposed immediately adjacent and downstream of the dryer unit.

In another example, the fiber speed is greater than 10 meters per second.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figures 1A, 1B:
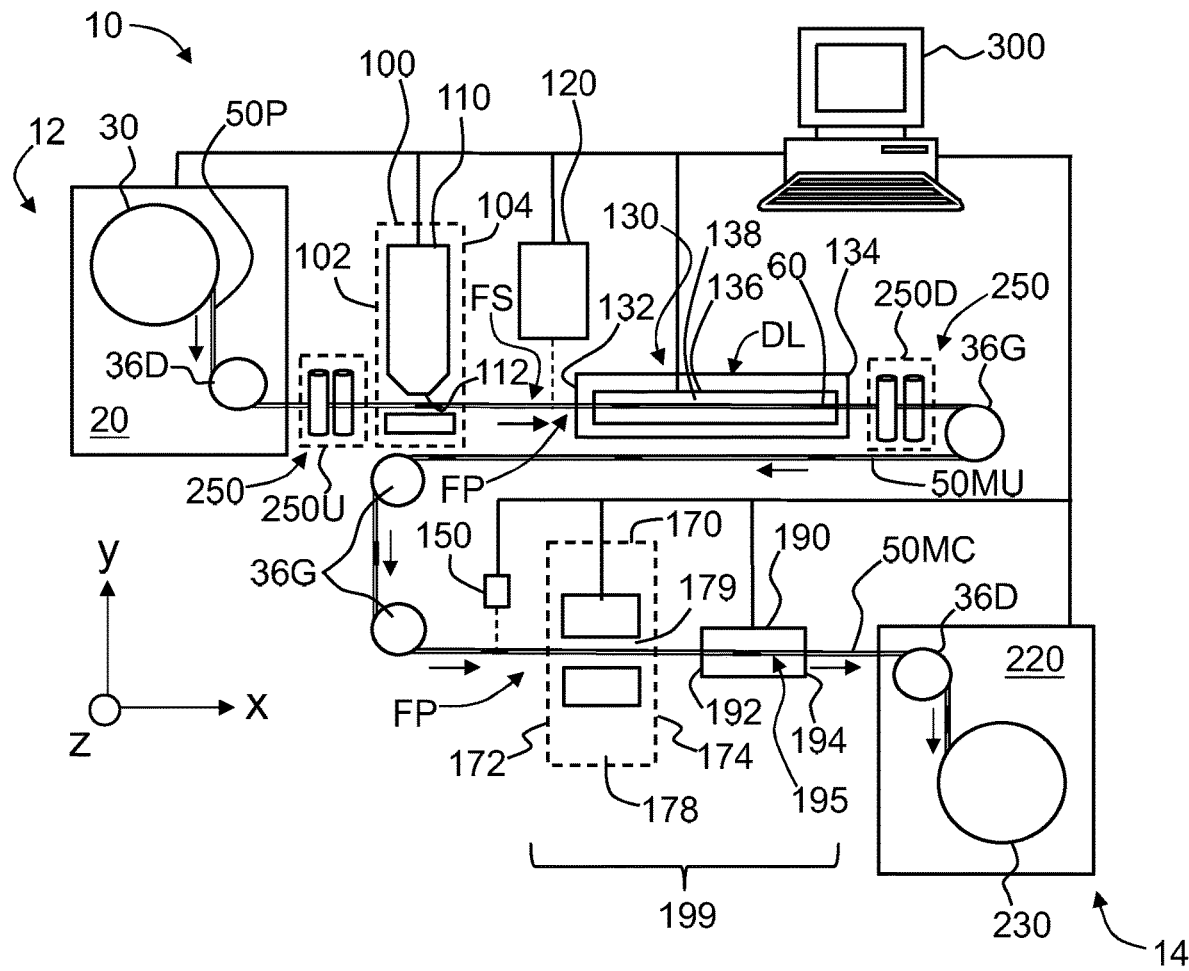
FIG. 1A is a schematic diagram of an example high-speed optical fiber marking apparatus for marking an optical fiber as disclosed herein.
FIG. 1B is a close-up cross-sectional view of an example unmarked optical fiber.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Likewise, relative terms like top, bottom, side, horizontal, vertical, etc. are used for convenience and ease of explanation and are not intended to be limiting as to direction or orientation.

The terms "downstream" and "upstream" are used herein to indicate positions relative to the direction of the movement of the optical fiber over a fiber path through the high-speed optical fiber marking apparatus as described below. Thus, an apparatus component B that is downstream (upstream) of an apparatus component A processes a given section of the optical fiber after (before) it is processed by the apparatus component A.

The number density of marks is denoted as N and is the number of marks per unit length, and is given as the number of marks per meter (m) unless stated otherwise.

The abbreviation "µm" is used to denote "micron" or "micrometer," with the abbreviation "nm" is used to denote "nanometer."

The "fiber speed" is the speed at which the optical fiber moves over the fiber path through the high-speed optical fiber marking apparatus, and is also referred to in the art as the "line speed."

The term "mark" as used herein is used to denote a type of simple indicia formed on an outer surface of the optical fiber over an axial mark length LM. The marks are spaced apart by an axial mark spacing LS. The term "patterned mark" is a type of mark that includes at least one space or gap within the mark, i.e., over the mark length. Such a space or gap within a given mark is not the same as the axial mark spacing LS, which as noted above is the spacing between adjacent marks. The patterned mark has a pattern length LP, which in an example can be same as or similar to the mark length LM, or can be substantially longer (e.g., $1.5 \cdot LM \leq LP \leq 4 \cdot LM$). In an example, the mark length LM or the pattern length LP are substantially smaller than the axial mark spacing LS. In examples discussed below, a patterned mark can be formed by a single ink-jet printer head or by using multiple ink-jet printer heads.

The term "vibration damper" as used herein means a device that reduces an amount of vibration of an optical fiber being moved through an optical fiber processing apparatus (e.g., an optical fiber marking apparatus) by physically contacting the optical fiber as it moves but not imparting a substantial bend or a substantial change in fiber direction and while also not adding substantial tension to the optical fiber. In examples, the change the fiber direction due to the vibration damper is no more than 1 degree or preferably no more than 0.5 degree or even more preferably no more than 0.1 degree. In addition, the change in the fiber tension due to the vibration damper is no more than 1% of the total fiber tension or more preferably no more than 0.5% of the total fiber tension or even more preferably no more than 0.1% of the total fiber tension (see the contact angle in the close-up insets of FIGS. 2A and 2B).

Thus, a guide pulley or drive pulley is not considered a "vibration damper" as this term is used herein because such guide pulleys substantially bend the optical fiber and substantially change the fiber direction while also adding substantial tension to the optical fiber. Guide pulleys and other components of an optical fiber processing apparatus can also impart vibration to the optical fiber, in which case they cannot be considered vibration dampers as the term is used herein.

A vibration damper reduces an amount of vibration in the optical fiber associated with the given optical fiber processing apparatus as compared to an initial amount of vibration imparted to the optical fiber by the optical fiber processing apparatus as operating without using or engaging or activating any vibration dampers.

The reduction in fiber vibration (i.e., vibration damping) by using one or more vibration dampers in the high-speed fiber marking apparatus ("apparatus") and methods described below is relative to the operation of the apparatus with no vibration dampers, i.e., to an amount of undamped vibration in the apparatus that would exist in the absence of vibration dampers. Thus, the optical fiber marking apparatus disclosed herein has an inherent amount of undamped fiber vibration that can be measured by disabling or removing the one or more vibration dampers. The remaining amount of fiber vibration is referred to herein as the damped fiber vibration (or just "damped vibration"), which is also readily measurable using the apparatus as described below. Aspects of the apparatus and methods disclosed herein apply when there is an amount of undamped vibration that makes marking of the moving optical fiber problematic because the fiber would be moving rapidly in and out of the optical fiber path at the marking location where the ink-based marking takes place.

High-Speed Optical Fiber Marking Apparatus

FIG. 1A is a schematic diagram of a high-speed optical fiber marking apparatus ("apparatus") 10 for marking an optical fiber ("fiber") 50. The apparatus 10 has a first or starting end 12 and a second or finishing end 14. The fiber 50 is subjected to various processes (described below) and is in various states as it passes through apparatus 10. Portions of the fiber 50 that differ in state or configuration are referred to herein as "fiber sections." As discussed more fully below, the fiber 50 includes fiber sections 50P (unmarked fiber), fiber sections 50MU (marked fiber), and fiber sections 50MC (marked fiber having an overcoat covering the marks). Fiber sections 50P, 50MU, and 50MC are referred to, respectively, as unmarked section 50P, marked section 50MU, and covered section 50MC, respectively. Portions of fiber 50 in fiber sections 50P, 50MU, and 50MC are referred to, respectively, as unmarked fiber, marked fiber, and covered fiber.

Figure 1C:
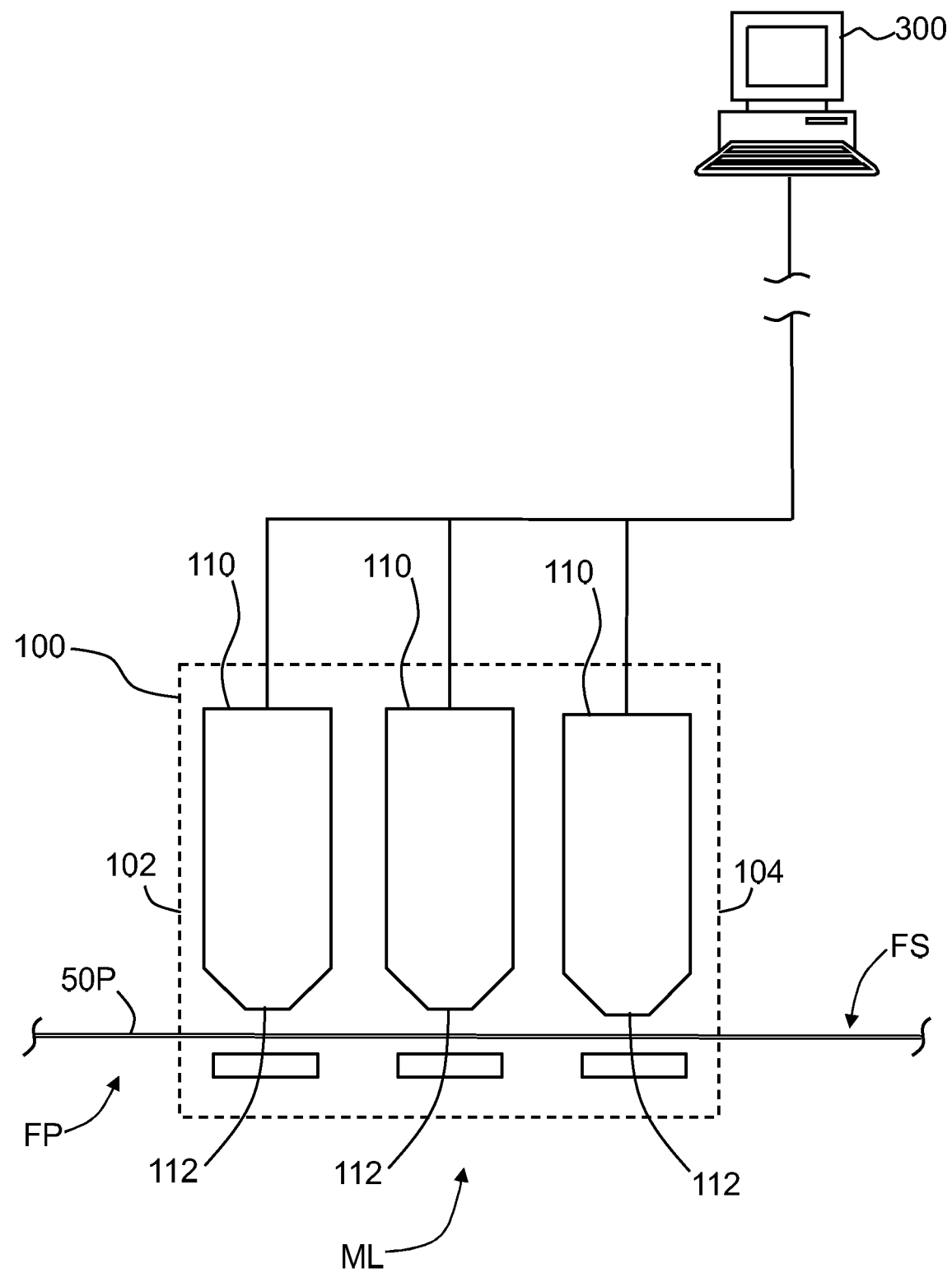
FIG. 1C is a close-up view of a printer unit of the apparatus illustrating an example where the printer unit comprises multiple ink-jet printer heads.

The unmarked section 50P of the fiber 50 is the portion of the fiber 50 upstream of marking location ML (FIG. 1C). The unmarked fiber section 50P is shown in cross-sectional view in FIG. 1B. The unmarked fiber in section 50P has a glass fiber 52 that includes a glass core and a glass cladding (not shown separately), and a coating 54 that includes one or more layers designed to prevent damage to the glass fiber 52 when the fiber 50 is handled or subjected to stress. The coating 54 is common to most optical fibers and is typically a polymer (e.g. acrylate or urethane). In a typical configuration, the coating 54 includes a low-modulus primary layer adjacent to the glass fiber 52 and a high-modulus secondary layer adjacent to the primary layer. The coating 54 has an outer surface 56, which defines the outer surface of the unmarked fiber in fiber section 50P. The fiber 50 has a centerline CL that defines an axial direction down the fiber.

With reference again to FIG. 1A, the apparatus 10 includes at the first end 12 a payout module 20. The payout module includes a storage reel 30 that stores a length of the fiber 50 in an unmarked state. The apparatus 10 also includes at the second end 14 a take-up module 220. The take-up module 220 includes a storage reel 230 that stores the fiber 50 after it has been marked and covered by the apparatus 10, as explained below. The payout module 20 and the take-up module 220 each include a drive pulley 36D used to drive the fiber 50 over a fiber path FP through the apparatus 10 from the payout module 20 to the take-up module 220. In an example, the fiber path FP is defined at least in part by one or more guide pulleys 36G, such as the multiple guide pulleys as arranged and shown in FIG. 1A. Other arrangements of the guide pulleys 36G can also be effectively employed in the apparatus 10. The fiber 50 has a fiber speed SF over the fiber path FP. In the example configuration of FIG. 1A, the most upstream drive pulley 36D and the first downstream guide pulley 36G define a fiber span FS that is under tension.

The apparatus 10 further includes printer unit 100 that resides downstream of the payout module 20 and upstream of the take-up module 220. The printer unit 100 is positioned along the fiber path FP (see FIGS. 1C and 2C). The printer unit 100 has an (upstream) input end 102 that receives unmarked fiber (fiber section 50P) and a (downstream) output end 104 that delivers marked fiber (fiber section 50MU) to downstream units of apparatus 10. The printer unit 100 includes at least one ink-jet printer head 110 with an output end 112 located proximate to the fiber path FP that delivers ink 114 in the form of ink droplets 115 to unmarked fiber at marking location ML. The marked section 50MU of fiber 50 is the portion of fiber 50 that is downstream from marking location ML and upstream of overcoat applicator 170. One ink-jet printer head 110 is shown for ease of illustration and explanation in FIG. 1A. FIG. 1C is a close-up view of an example printer unit 100 that includes three ink-jet printer heads 110 each operably connected to a controller 300, which is introduced and discussed below.

Figure 2A:
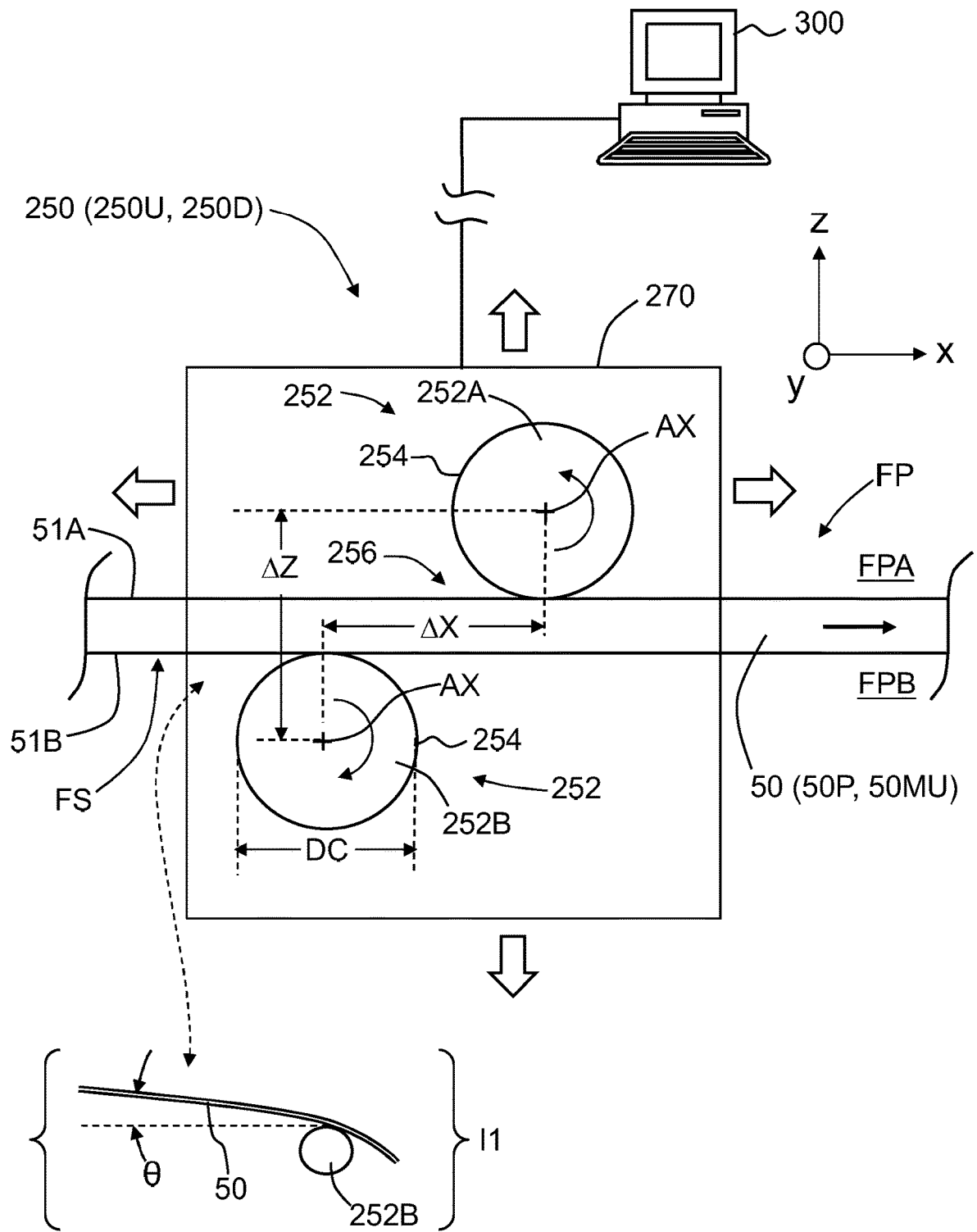
FIG. 2A is a close-up top-down view of an example vibration damper.
Figure 2B:
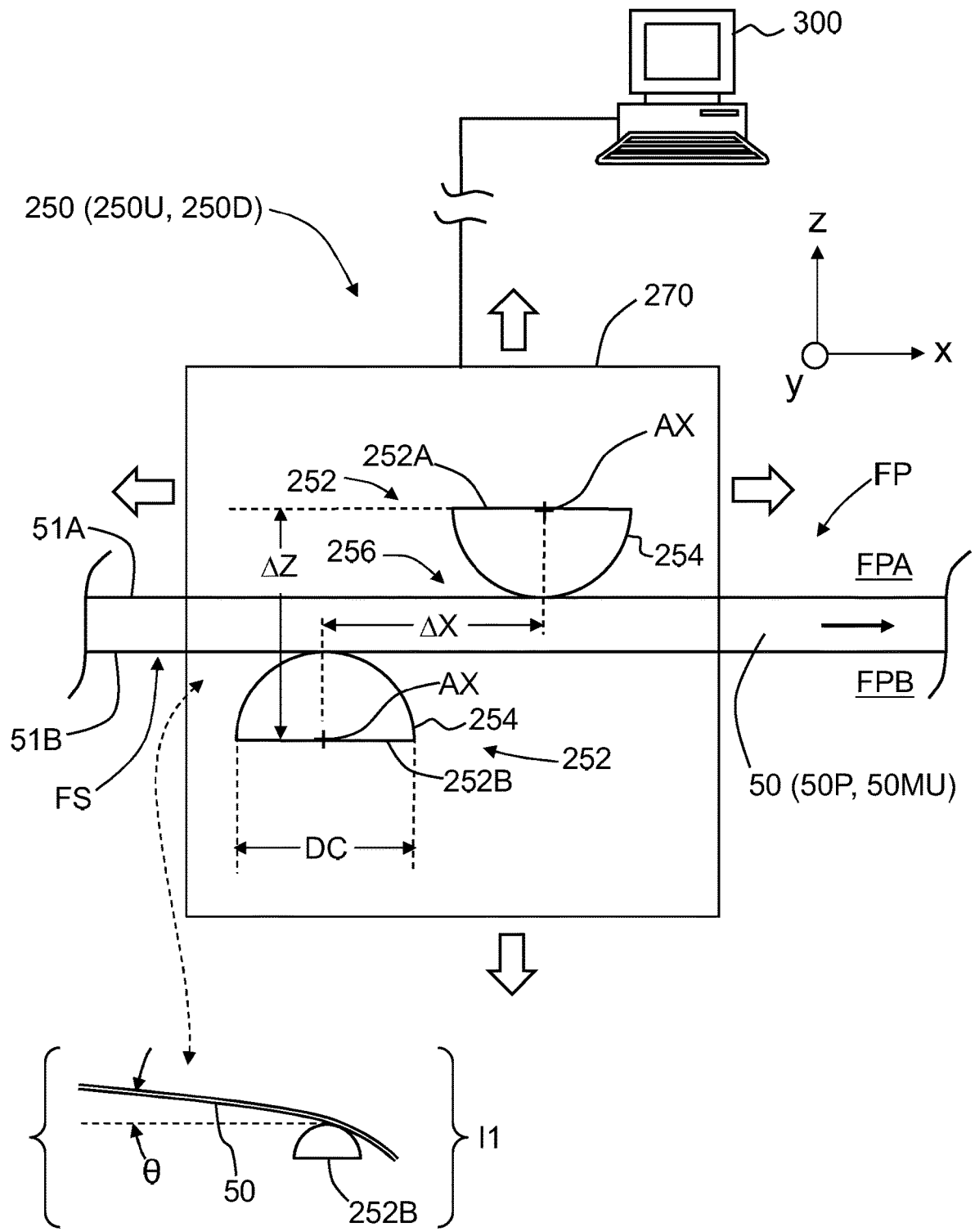
FIG. 2B is similar to FIG. 2A and shows an example where the guide members of FIG. 2A are replaced with semi-guide members that do not rotate.
Figure 2C:
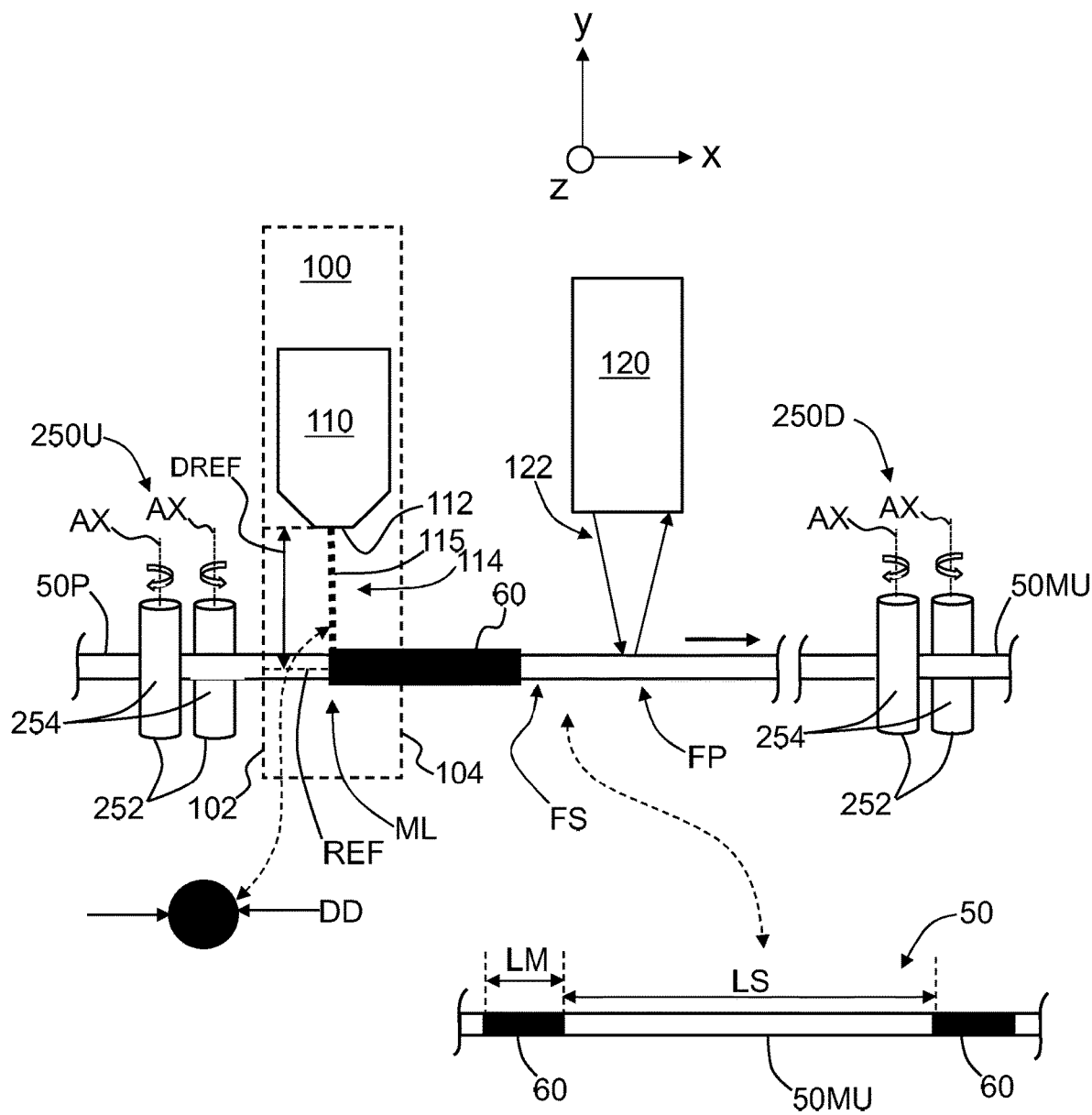
FIG. 2C is a close-up view of the apparatus showing first and second vibration dampers arranged relative to the printer unit for marking the unmarked optical fiber, and a position sensor for measuring the position (vibration) of the newly marked optical fiber close to the printer unit.

A position sensor 120 resides immediately downstream of the printer unit 100 and is operably arranged relative to the fiber path FP to measure a displacement of the fiber 50 relative to a reference position REF, e.g., a nominal or ideal fiber path, which is discussed in greater detail below and an example of which is shown in FIG. 2C.

The position sensor 120 can also reside immediately upstream of the printer unit 100 or can be arranged to measure the position of fiber 50 at the marking location ML associated with the printer unit 100, as discussed below. A dryer unit 130 resides downstream of the position sensor 120 and includes an input end 132 for receiving the marked section 50MU of the fiber 50 and an output end 134 for delivering the marked fiber in a state in which the ink 114 used to make the marks 60 has dried. The dryer unit 130 defines a drying location DL along the fiber path FP. In an example, the dryer unit 130 comprises a dryer tube 136 with an interior 138 through which the fiber path FP passes.

A mark counter 150 resides immediately downstream of the dryer unit 130 and is operably arranged relative to the fiber path FP. An overcoat applicator 170 resides downstream of the marking counter 150 and includes an input end 172 that receives the marked fiber (fiber section 50MU) and an output end 174 that delivers covered fiber (fiber section 50MC). The fiber path FP passes through the overcoat applicator 170. In an example, the overcoat applicator 170 includes a coating tube 178 with an interior 179 through which the fiber path FP passes.

A curing system 190 resides immediately downstream of the overcoat applicator 170 and has an input end 192 for receiving the covered fiber 50MC with an uncured overcoat, an output end 194 for delivering covered fiber with a cured overcoat, and an interior 195, with the fiber path FP passing through interior. The aforementioned take-up module 220 resides immediately downstream of the curing system 190 at the second (finishing) end 14 of the apparatus 100. The covered fiber section 50MC corresponds to the portion of fiber 50 downstream from the overcoat applicator 170 through the take up module 220. The combination of the overcoat applicator 170 and the curing system 190 defines a coating system 199.

The apparatus 10 also includes at least one vibration-damping device ("vibration damper") 250 arranged in the fiber path FP to reduce the amount of vibration in the fiber 50 substantially at the marking location ML as the unmarked fiber travels through the printer unit 100. In an example, a first vibration damper 250U is operably disposed upstream of the printer unit 100 and within the fiber span FS between the payout module 20 and the input side 102 of the printer unit 110. The first vibration damper 250U is preferably disposed as close as possible to the printer unit 100, such as immediately adjacent its input side 102. A second vibration damper 250D can be operably disposed in the fiber span FS adjacent the output end 134 of the dryer unit 130. The reason that the second vibration damper is so placed is to first allow for marks formed on the unmarked fiber at marking location ML to be dried, as explained below.

The vibration damper 250 makes physical contact with the fiber 50 and is configured to mitigate vibrations in the fiber as it passes over the portion of the fiber path FP beneath the printer module 100, as described in greater detail below. Thus, the vibration damper 250 is contact-based by virtue of its making physical (direct) contact with the fiber 50. In an example the amount of force of the contact on the fiber 50 from the vibration damper 250 is enough to dampen vibrations in the fiber 50 to a suitable degree without substantially altering the fiber path FP, i.e., without substantially bending or adding substantial tension to the fiber 50. Thus, as noted above, the term "vibration damper" as used herein does not encompass either a guide pulley 36G or a drive pulley 36D, since such guide pulleys substantially bend the fiber while also adding substantial tension to the fiber and possibly also causing the fiber to vibrate.

The apparatus 10 includes a controller 300 that is operably connected to the payout module 20, the take-up module 220, the printer unit 100 (and in particular to the one or more ink-jet printer modules 110 therein), the position sensor 120, the dryer unit 130, the mark counter 150, the overcoat applicator 170 and the curing system 190. The controller 300 is configured to control these apparatus components and the overall operation of the apparatus 10, including the speed SF of the fiber 50 through the apparatus 10 over the fiber path FP.

In an example, the controller 300 comprises a programmable logic controller (PLC) configured to carry out instructions (software, firmware, etc.) embodied in a non-transitory computer-readable medium and that cause the apparatus 10 to carry out the methods disclosed herein. In some examples, the controller 300 need not be connected to and control some of the apparatus components that could be operated independently. Also in some embodiments, the controller 300 can be operably connected to at least one of the first and second vibration dampers 250U and 250D to control the amount of vibration damping one or both of these devices contribute to the methods disclosed herein (see FIG. 2A). In one example, the vibration damper 250 can be operably supported by a movable support stage 270 (see FIG. 2A) that can be moved by the controller 300 to adjust (e.g., minimize) the amount of vibration based on position (vibration) measurements made by the position sensor 120. In examples, the first and second vibration dampers 250 can be mounted on the same movable support stage 270 or on separate and independently movable support stages.

While the fiber speed SF can be relatively slow (e.g., 0.5 m/s), the apparatus and methods disclosed herein are particularly useful for fiber speeds in excess of about 2 m/s or 5 m/s or 10 m/s, which are the speeds at which the vibration of the fiber 50 starts to vibrate substantially and can result in marking errors that exceed a reasonable marking error tolerance. In an example, apparatus and methods disclosed herein preferably operate at fiber speeds SF of greater than 2 m/s, or greater than 5 m/s or 10 m/s or greater, and up to the maximum fiber speed of the apparatus 10, which in an example is about 25 m/s.

Vibration Damper

FIG. 2A is a close-up top-down view of an example vibration damper 250 (i.e., 250U or 250D). The fiber 50 is operably arranged therewith along the fiber path FP, with the fiber having first and second opposite sides 51A and 51B for reference. Fiber 50 enters vibration damper 250 as either unmarked fiber of fiber section 50P or marked fiber of fiber section 50 MU.

In an example, the vibration damper 250 includes two guide members 252, denoted 252A and 252B. Each guide member 252 has an outer surface 254 and further in an example includes a central (long) axis AX that runs in the y-direction. In an example, the guide members 252A and 252B are cylindrical and have parallel central axes AX. The guide members 252A and 252B are offset from one another in the z-direction by a z-offset $\Delta Z$ and in the x-direction by an x-offset $\Delta X$, wherein the two offsets are measured with respect to the central axes AX. In FIG. 2A, the fiber path FP is shown as having first and second opposite sides FPA and FPB.

The z-offset is selected such that that the first and second guide members 252A and 252B can respectively reside on the first and second sides FPA and FPB of the fiber path FP and thus respectively adjacent and in contact with the first and second opposite sides 51A and 51B of the fiber 50. The spaced apart guide members 252A and 252B define a guide member gap 256 through which the fiber 50 passes. The first and second sides 51A and 51B of the fiber 50 respectively contact the outer surfaces 254 of the first and second guide members 252A and 252B as the fiber 50 passes through the guide member gap 256. In an example of this configuration, the two guide members 252A and 252B can counter-rotate, i.e., have opposite rotation directions about their respective central axes AX. In an example, the guide members 252A and 252B can be fabricated such that their outer surfaces comprise a hard, low-friction material, such as alumina. In some embodiments, the guide members 252A and 252B are rotatable but the fiber 50 only grazes the two guide members so that they may not experience enough frictional force from the fiber to force their rotation. In some embodiments such as shown in FIG. 2B, the guide members 252A and 252B can be fixed, i.e., non-rotatable, or they can be only partially rotatable. In the example embodiment of FIG. 2B, the guide members 252A and 252B are shown as semi-circular cylinders but can also be quarter-circular cylinders or have a geometry where the outer surface 254 varies only in one direction in the general region where the fiber 50 contacts the guide members 252A and 252B (e.g., the outer surface has a cylindrical portion).

In the examples of FIG. 2A and FIG. 2B, the fiber 50 is shown as being straight, but the fiber 50 can also follow a slightly bent fiber path FP through the guide members 252A and 252B by adjusting (decreasing) the z-offset $\Delta Z$ of the two guide members. In an example, the guide members 252 have the same diameter DC, and in an example the z-offset $\Delta Z$ is about equal to the diameter DC to ensure that the fiber 50 makes tangential or grazing contact with the outer surfaces 254 of the two guide members 252A and 252B. In one example, the contact angle $\theta$ that the fiber 50 makes with the outer surface 254 of the guide members 252 (and that measures a change in direction of the fiber) is less than 0.1 degree (see insets 11 of FIGS. 2A and 2B). Also in an example, the x-offset $\Delta X$ can be up to about twice the diameter DC. An example diameter DC for the first and second guide members 252A and 252B is 1 inch, though other diameters can be effectively employed.

Apparatus Set Up

With continuing reference to FIG. 1A, as part of the setting up of apparatus 10, the storage reel 30 with the unmarked fiber (fiber section 50P) is loaded into the payout module 20. The unmarked fiber is then fed through the nearby drive pulley 36D and through the first vibration damper 250U.

With reference also to FIG. 2C as well as to FIG. 1A, the unmarked fiber is led over the fiber path FP through the printer unit 100 and then passed to the position sensor 120 and through the interior 138 of the dryer unit 130 and then through the second vibration damper 250D, which in an example is configured essentially the same as if not identical to the first vibration damper 250U. The marked fiber (fiber section 50MU) is then led around the three guide pulleys 36G that reside downstream of the second vibration damper 250D. The marked fiber is then led under the mark counter 150, through the overcoat applicator 170 and then through the curing system 190. FIG. 2C is a close-up view of the apparatus 10 showing first and second vibration dampers 250U and 250D, the printer unit 100 and the position sensor 120 in an exemplary configuration.

The covered fiber (fiber section 50MC) is then led around the drive pulley 36D of the take-up module 220 and onto the take-up reel 230.

Method of Operation

Once the fiber 50 is set up to travel over the fiber path FP through the apparatus 10 and its various components as described above, the controller 300 activates the drive pulleys 36D of the payout module 20 and the take-up module 220 to start moving the fiber 50 along the fiber path at a select speed SF.

Once the fiber 50 ramps up to the select fiber speed SF, the controller 300 activates the printer unit 100. With reference to FIG. 2C, this includes causing the ink-jet printer head 110 to dispense from its output end 112 ink-jet-printer ink ("ink") 114. The dispensed ink 114 is directed to the outer surface 56 of the unmarked fiber at marking location ML as the unmarked fiber passes below the ink-jet printer head 110 while traveling at the fiber speed SF. In an example, the ink 114 includes a pigment and a solvent such as methylethylketone (MEK).

Also in an example, the ink 114 is dispensed in ink droplets 115 having a droplet diameter DD of between 40 μm and 80 μm. The use of such relatively small ink droplets 114 provides certain advantages. First, small ink droplets 115 can have a greater velocity leaving the ink-jet printer head 110 than larger droplets, which translates into faster marking. The small ink droplets 115 also provide greater marking resolution and marking control than larger droplets. The use of small ink droplets 115 also saves ink and is therefore more economical.

The ink 114 is dispensed for a brief time interval $\Delta t_D$ so that the ink defines a mark 60 having an axial length LM (i.e., a length in the x-direction or in the direction of the fiber centerline CL) of $LM = \Delta t_D \cdot SF$. In an example, the axial length LM of the marks 60 is in the range between 1 mm and 5 mm. The mark 60 can be in the form of a ring that extends all of the way around the fiber circumference (closed ring), or at least more than halfway around the fiber circumference (e.g., >180 degrees or even >220 degrees) (open ring) (see e.g., FIGS. 5A and 5B, introduced and discussed below). The extent to which a mark 60 extends around the fiber circumference generally depends on the surface tension of the ink 114 and the wettability of the outer surface 56 of the unmarked fiber. The fiber surface conditions and the properties of the ink 114 are generally conducive for depositing the ink on just one side of the fiber 50 while still being able to form a ring-type mark 60.

The controller 300 controls a time interval $\Delta t_1$ between activation of the ink-jet printer head 110 so that the marks 60 are axially spaced part (i.e., in the x-direction) by a mark spacing LS. In an example, the mark spacing LS between the marks 60 is in the range between 25 mm and 500 mm, or 50 mm to 250 mm, with the spacing of 250 mm being suitable for fibers used in submarine cables. In an example, the number density N is between 1 and 40 per meter, or between 2 and 20 per meter, or between 3 and 10 per meter, or between 3 and 7 per meter.

To ensure that the marks 60 are properly formed using the relatively small ink droplet sizes discussed above, the unmarked fiber cannot deviate in the z-direction from the fiber path FP beneath the ink-jet printer head 110 by more than a select displacement tolerance δz, which in an example is δz<40 μm or even smaller (e.g., δz<30 μm). Deviations in the y-direction are not as critical since such deviations do not cause a lateral misalignment between the output end 112 of the ink-jet printer head 110 and the unmarked fiber. The position sensor 120 is used to measure lateral or z-positional deviations and is preferably positioned in close proximity to output end 112 of the ink-jet printer head 110. As noted above, the position sensor 120 can be placed immediately upstream of ink-jet printer head 110 (in which case it detects z-positional deviations of unmarked fiber) or immediately downstream from ink-jet printer head 110 (in which case it detects z-positional deviations of marked fiber). In an example, the position sensor 120 is optics based and uses a light beam 122 to determine the position of the fiber 50 as function of time. Rapid variations of the position of the fiber 50 relative to the reference position REF (e.g., the ideal fiber path FP at the printer unit 100) constitute vibrations. It is noted that measuring the amount of PP vibration does not require a reference position REF.

In an example, the reference position REF is defined by the position of the fiber 50 at rest, i.e., with a fiber speed of zero, but under tension over the given fiber span FS. In another example, the reference position REF determined with the fiber 50 moving at a fiber speed and with the vibration dampers 250 activated. In an example, the reference position REF is the defined by the middle of a marking process window. The marking process window can be defined as range of the (y,z) position of the marking location ML of the fiber 50 relative to the printing unit 100 where marking can be carried out. The middle of the marking process window is the center of the (y,z) position range and is denoted in FIG. 2C as an optimum distance DREF of the fiber 50 from the output end 112 of the ink-jet printer head 110. In an example, the fiber path FP can be adjusted relative to the printer unit 100 to establish the reference position REF of the fiber 50 at the middle of the marking process window. The fiber path FP can be so adjusted by adjusting the position of select drive and guide pulleys 36D and 36G and/or by adjusting the positions of the vibration dampers 250 using one or more movable support stages 270. The reference position REF as measured relative to the position sensor 120 can be set to "zero" by the controller 300.

Figure 3A:
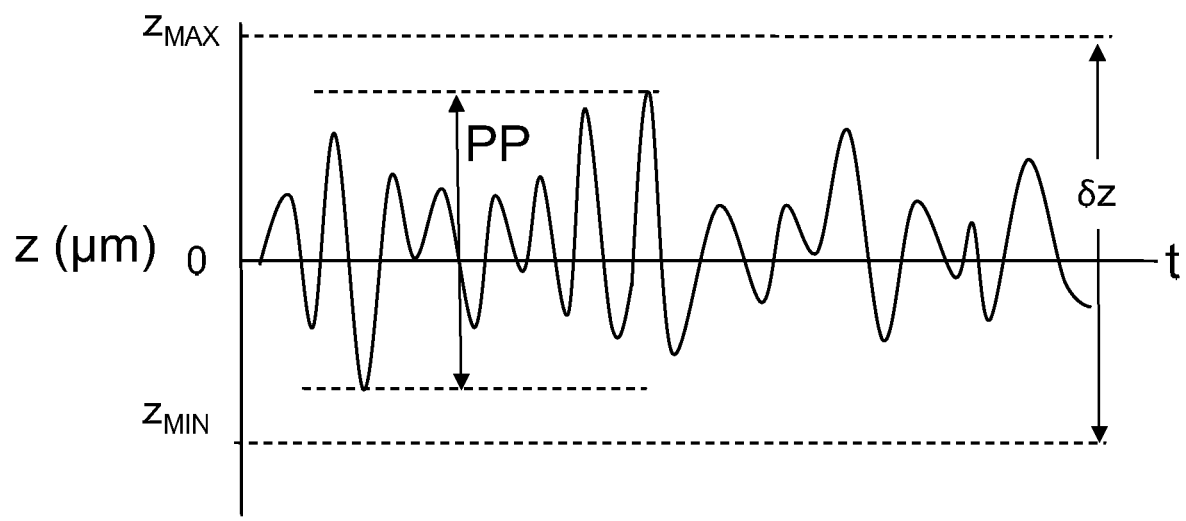
FIG. 3A is a schematic plot of the z-displacement z (μm) of the optical fiber versus time t (arbitrary units) as measured by the position sensor, and illustrating vibration of the fiber with a peak-to-peak vibration (PP) and also showing an example vibration tolerance δz on the amount of fiber vibration in the vicinity of the printer unit.

FIG. 3A is a schematic plot of the z-position z (μm) of the fiber 50 versus time t (arbitrary units) as measured by the position sensor 120. The plot of FIG. 3A illustrates an example of how the fiber 50 can be displaced in the z-direction (i.e., in a plane perpendicular to the direction of the ink droplet deposition direction in the −y direction) as it moves along the fiber path FP. In an example, the z-position of the fiber 50 as measured by the position sensor 120 is sent to the controller 300 for recording (storing) and optional additional processing. The z-position displacements occur over relatively short time intervals (fractions of a second) and are caused by vibration of the fiber 50 as it moves over the fiber path FP and interacts under tension with the various components of the apparatus 10. The plot of FIG. 3A shows the upper and lower limits $z_{MAX}$ and $z_{MIN}$ that define a z-displacement tolerance δz ($δz=z_{MAX}-z_{MIN}$) as well as the maximum measured peak-to-peak displacement, denoted PP and referred to hereinafter as the PP displacement. The z-displacement tolerance δz is also referred to herein as the vibration tolerance and provides a measure of the acceptable amount of damped vibration of the unmarked fiber at the marking location ML adjacent to output 112 of printer unit 100. The vibration damper(s) 250 is (are) configured to maintain the PP displacement below the z-displacement tolerance δz.

As noted above, position sensor 120 can be arranged so that it measures the position of the fiber 50 at the marking location ML. This can be done in one example by temporarily replacing the printer unit 100 with the position sensor and running the apparatus 10 at the fiber speed FS to be used for fiber marking. In other cases, it may be more convenient to locate the position sensor 120 so that it measures the position of the fiber 50 close to and not directly at the marking location ML to avoid interfering with the marking process. In an example, the position sensor 120 can arranged to measure the position of the fiber 50 a few inches (e.g., 2" to 4") offset from the marking location ML along the fiber path FP. This position measurement offset is sufficiently accurate for measuring or at least closely estimating the displacement at the marking location ML when the fiber span is tens of inches long (e.g., the offset is 10% or less of the total fiber span). Of course, the position sensor location preferably avoids measuring the fiber position at a vibrational node for the largest amplitude vibrational modes.

Experiments were conducted where unmarked fiber was marked using the apparatus 10 without using the first and second vibration dampers 250. The PP displacement in the z-direction associated with the undamped vibration of the unmarked fiber was measured to be in the range from 55 μm to 60 μm for a fiber speed SF of 14 m/s. In related experiments, even larger PP displacements were measured for the undamped vibration. Such PP displacements proved to be too large to effectively mark the unmarked fiber.

Figure 3B:
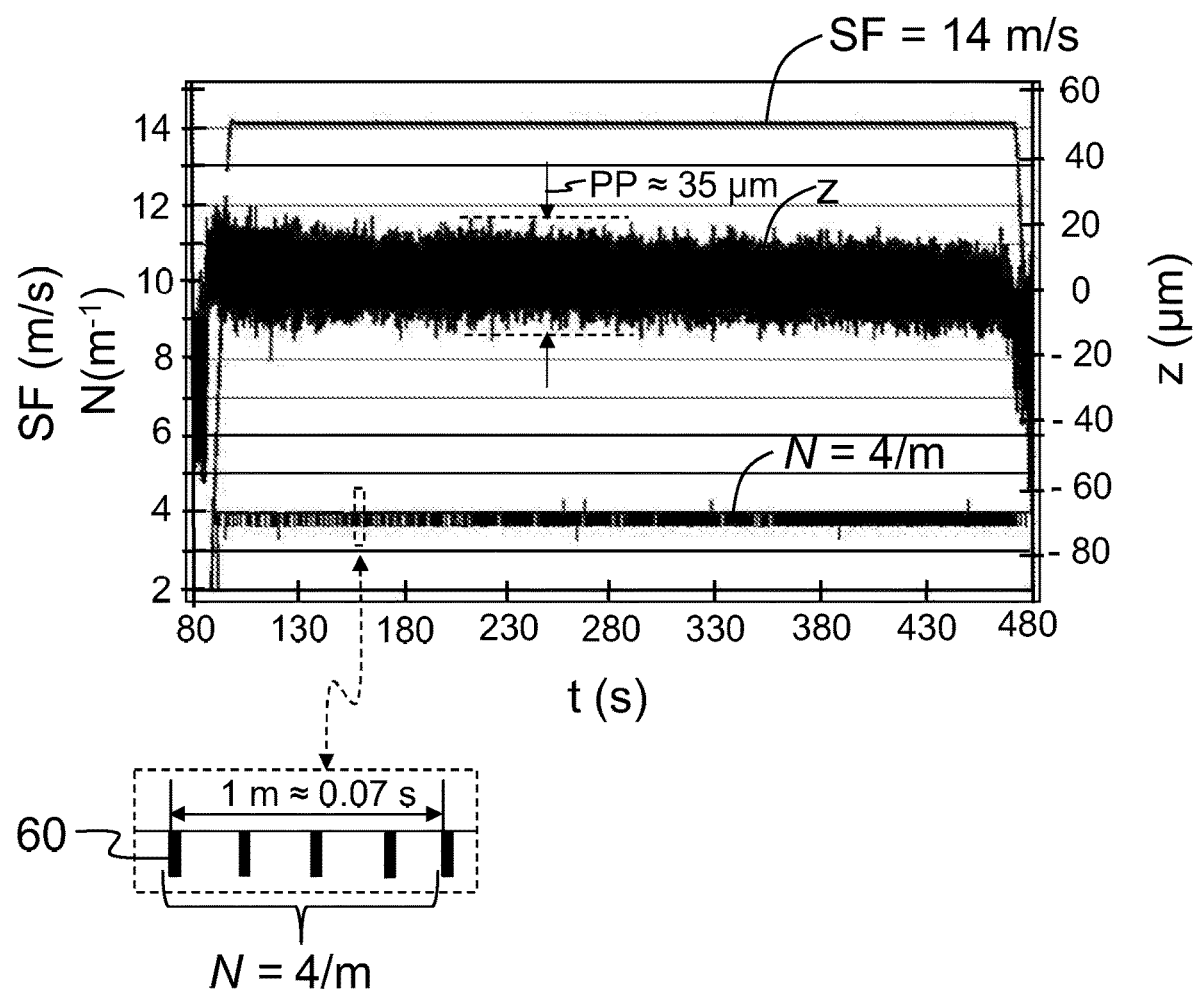
FIG. 3B are measurements of the z-displacement z (μm) of the optical fiber versus time t (arbitrary units) for an example high-speed optical fiber marking apparatus that includes a single vibration damper operably disposed upstream and immediately adjacent the printer unit, wherein the fiber speed over the fiber path was 14 meters per second (m/s), and the marking rate N was four (4) marks per meter.

FIG. 3B is similar to FIG. 3A and shows actual displacement (vibration) measurements for an example configuration of the apparatus 10 that included only one vibration damper 250U located upstream of the ink-jet printer module 100. The PP displacement was reduced (damped) to about 35 μm, which was satisfactory for marking the unmarked fiber 50. The close-up inset shows the frequency (rate) at which the marks 60 occur, with the number density N shown. In the experiment for the data of FIG. 3B, N=4/m and the fiber speed SF=14 m/s.

Figure 3C:
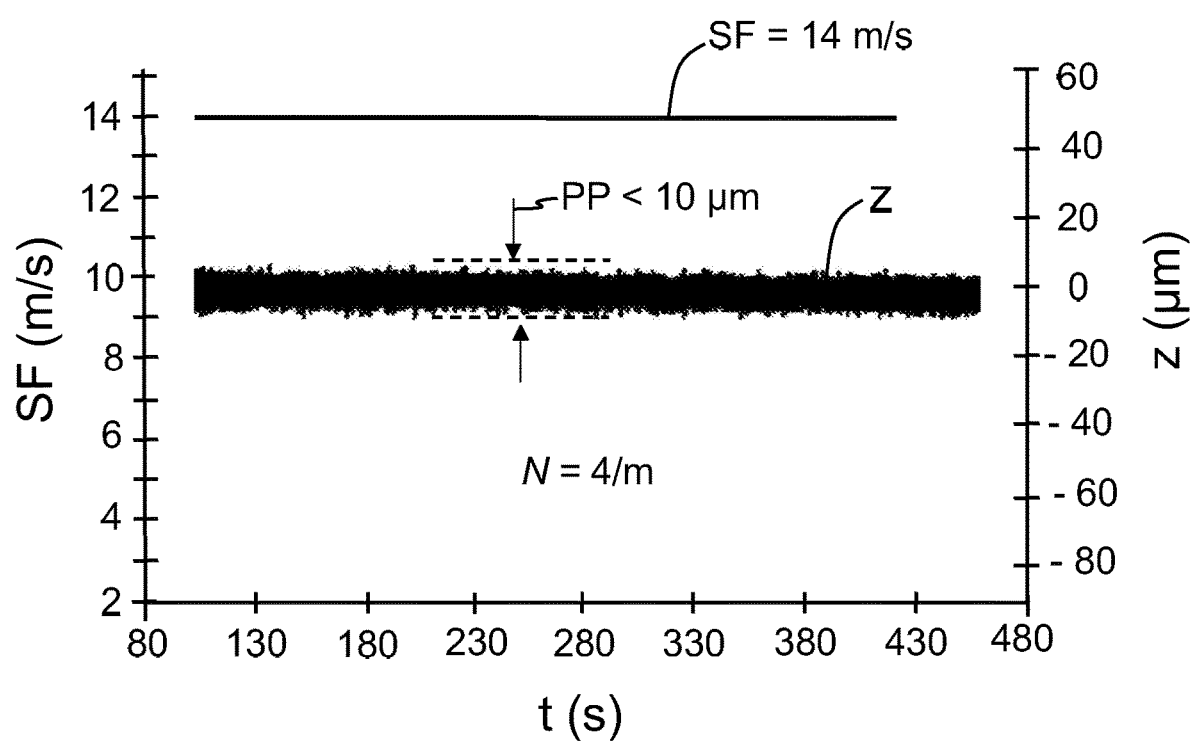
FIG. 3C is similar to FIG. 3B and illustrates example z-displacement data for an example high-speed optical fiber marking apparatus that includes two vibration dampers, wherein the peak-to-peak vibration (PP) is less than 10 μm.

FIG. 3C is similar to FIG. 3B and shows example displacement (vibration) measurements for an example configuration of the apparatus 10 that included both the first and second vibration dampers 250U and 250D such as shown in example embodiment of FIG. 1A. The PP displacement was reduced (damped) to less than 10 μm at fiber speed SF of 14 m/s, which was very satisfactory for marking the unmarked fiber given the relatively high fiber speed SF.

In examples, apparatus 10 and one or more vibration dampers 250 operate to keep the PP displacement of the unmarked fiber to be less than 40 μm, or more preferably less than 30 µm, or even more preferably less than 20 µm, or even more preferably less than 10 µm at the marking location. The position sensor 120 sends z-displacement measurement information to the controller 300, which monitors the vibration data and either terminates the marking process or generates a warning signal (or both) if the z-displacement measurements exceed the z-displacement tolerance δz.

Note that in the case where the position sensor 120 measures the position of the fiber 50 relatively far away from the marking location ML, the actual displacement measurement may be substantially less than at the marking location, e.g., for a marking location PP displacement of 40 µm, the corresponding displacement at the position sensor may be 35 µm or some other known amount. In an example, the actual fiber displacements at the marking location ML and at the offset location can both be measured at various fiber speeds to empirically establish the relationship between the PP displacement measurements at the two different locations and for the various fiber speeds. This information can be stored in the controller 300 in the form of a look-up table or as a mathematical relationship (e.g., based on a best fit to the data).

Once the ink 114 is deposited on the unmarked fiber to form the mark 60, the ink needs to be dried so that the mark 60 becomes substantially permanent. This is accomplished by passing the marked fiber exiting the printer unit 100 at the output end 104 through the interior 138 of the dryer tube 136 of the dryer unit 130. In one example, the dryer unit 130 is configured to flow hot air through the interior 138 of the dryer tube 136 to dry the ink 114 that forms the mark 60. In a particular example, the hot air flashes off substantially all of the MEK (or other solvent) from the ink 114 to leave pigment on the outer surface 56. Evaporation of the solvent improves the adhesion between the mark 60 and the outer surface 56. The mark 60 has a thickness THM (see FIG. 5A), which in an example is in the range from 350 nm to 800 nm, depending in part on the characteristic (e.g., transparency and color) of the overcoat used to cover the marks, as introduced and discussed below. The dryer unit 130 is not limited to an air-based dryer and in other examples the drying can be accomplished using other means, such as microwaves, infrared radiation, ultraviolet radiation, convected hot air, etc.

With reference again to FIG. 1A and to FIG. 2C, the marked fiber (fiber section 50MU) exits the output end 134 of the dryer unit 130 and then passes through the second vibration damper 250D, noting that at this point, the mark 60 is dry and so can make contact with the surfaces 254 of the guide members 252 of the second vibration damper without smearing. The marked fiber then passes by the marking counter 150, which counts the number of marks, e.g., as a measured number density $N_M$. The measured number density $N_M$ from the mark counter 150 is sent to the controller 300 and compared to the expected (selected) number density N. The mark counter 150 is used for quality control, i.e., to ensure that the correct number density N is being formed, to spot any missing marks 60, to find extra marks, and to identify incorrectly formed marks. Such marking errors can arise due to problems with the fiber speed SF, excess fiber vibration, issues with the ink-jet print head 110, etc.

Figure 4:
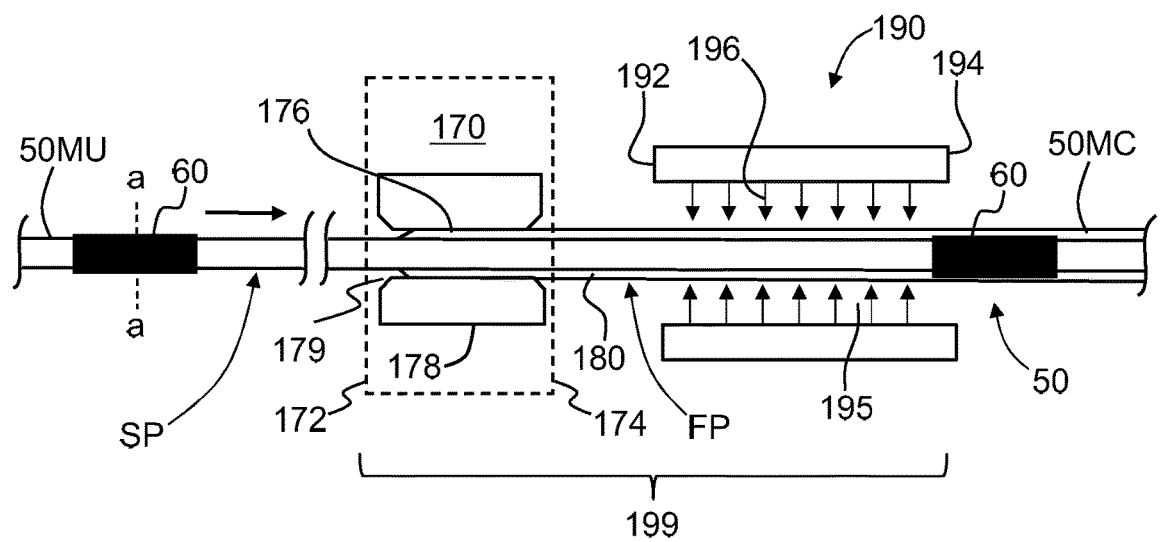
FIG. 4 is a close-up view of the portion of the high-speed optical fiber marking apparatus that includes an overcoat applicator and a curing system.
Figure 5A:
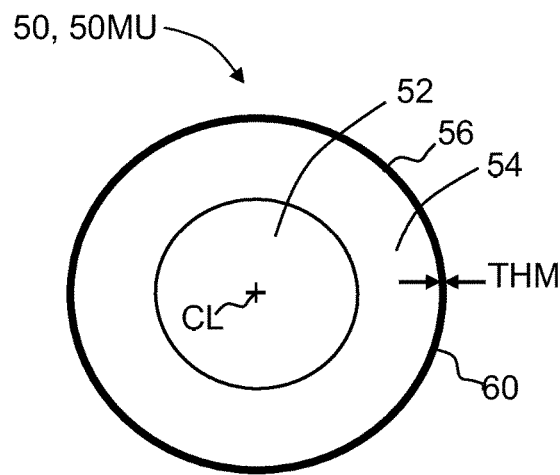
FIG. 5A is a cross-sectional view of the marked but uncoated optical fiber as taken along the line a-a in FIG. 4 at a location of a mark, and showing the thickness (THM) of the mark.
Figure 5B:
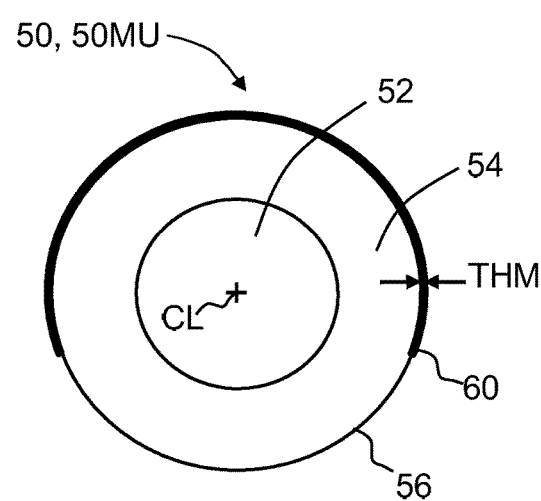
FIG. 5B is similar to FIG. 5A and illustrates an example mark that does not make a complete ring about the outer surface of the optical fiber but that covers more than 180° of the optical fiber circumference.

With reference now to FIG. 1A and to FIG. 4, the marked fiber (fiber section 50MU) continues to the overcoat applicator 170 of the coating system 199. FIG. 5A is a cross-sectional view of the marked fiber (fiber section 50MU) taken at one of the marks 60 at the location a-a in FIG. 4 and illustrates an example ring-type mark 60 that makes a complete circuit of the optical fiber circumference (closed ring mark). FIG. 5B is similar to FIG. 5A and illustrates an example ring-type mark 60 that does not make a complete circuit of the outer surface 56 of the optical fiber 50, but that covers more than 180° of the optical fiber circumference (open ring mark).

The overcoat applicator 170 deposits an overcoat material 176 on the outer surface 56 of the marked fiber of fiber section 50MU to form the covered fiber of covered fiber section 50MC. The overcoat material 176 forms a protective overcoat 180 over the entire outer surface 56, including any marks 60 thereon. In an example, the overcoat applicator 170 comprises a coating tube 178 with an interior 179 through with the fiber path FP passes. The overcoat material 176 is provided to the interior 179 so that the fiber 50 passes through the overcoat material 176, which is the substantially uniformly applied around the circumference (or portion thereof) of the outer surface 56 of the marked fiber (fiber section 50MU).

In an example, the overcoat material 176 is at least semi-transparent so that the marks 60 are visible through the overcoat 180. Further in an example, the overcoat material 176 can be colored (e.g., via a pigment) to define a colored overcoat 180, e.g., yellow for submarine fibers 50. In an example, the overcoat material 176 is light-curable, e.g., by ultraviolet (UV) radiation. In an example, the overcoat material 176 comprises a UV-curable acrylate. The main purpose of the overcoat 180 is to protect the marks 60 from external wear, such as from handling by field personnel, abrasion or rubbing against adjacent fibers or cable surfaces, etc.

Upon exit from overcoat applicator 170, the fiber 50 is passed through the curing system 190 to cure the overcoat material 176. In an example, the curing system 190 is light based and is configured to generate actinic light 196 (e.g., UV radiation) that irradiates the overcoat material 176 and cures it to form overcoat 180. In an example, the curing system 190 has an interior 195 and the actinic light 196 is incident upon the overcoat material 176 from substantially 360°.

Figure 6A:
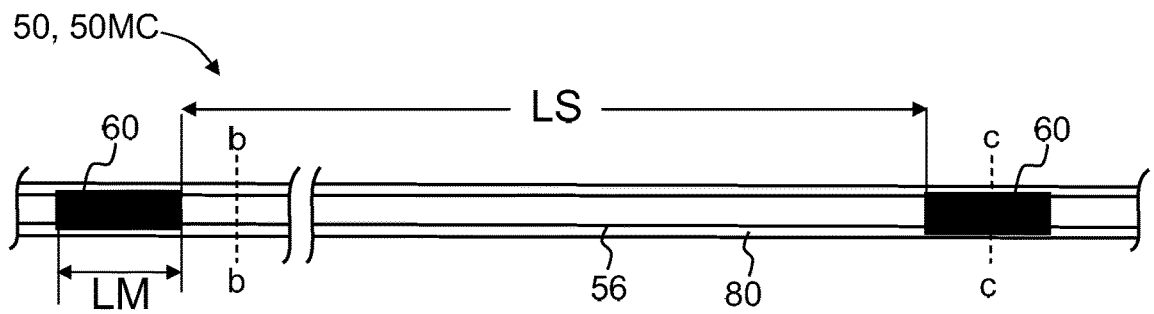
FIG. 6A is a close-up cross-sectional view of an example of a marked and coated optical fiber illustrating axial dimensions for the mark length (LM) and the mark spacing (LS).
Figure 6B:
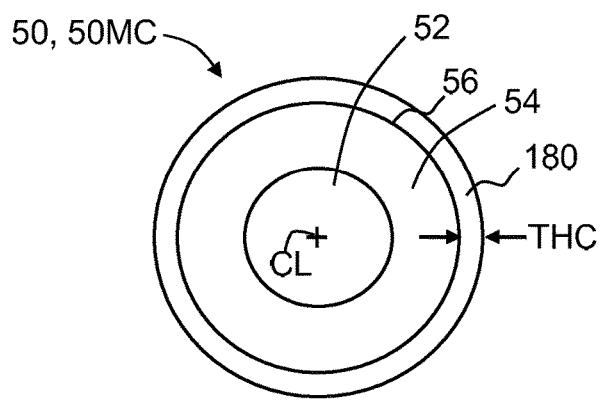
FIG. 6B is a cross-sectional view of the marked and coated optical fiber as taken along the line b-b in FIG. 6A at a location where there is no mark, and showing the thickness (THC) of the protective coating formed on the outer surface of the optical fiber.
Figure 6C:
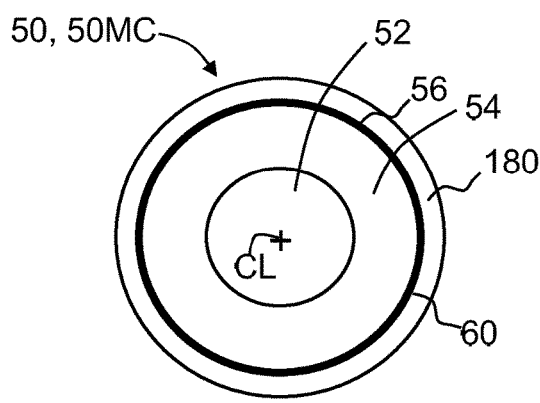
FIG. 6C is similar to FIGS. 5A and 6B and is taken along the line c-c in FIG. 6A at a mark location.
Figure 7A:
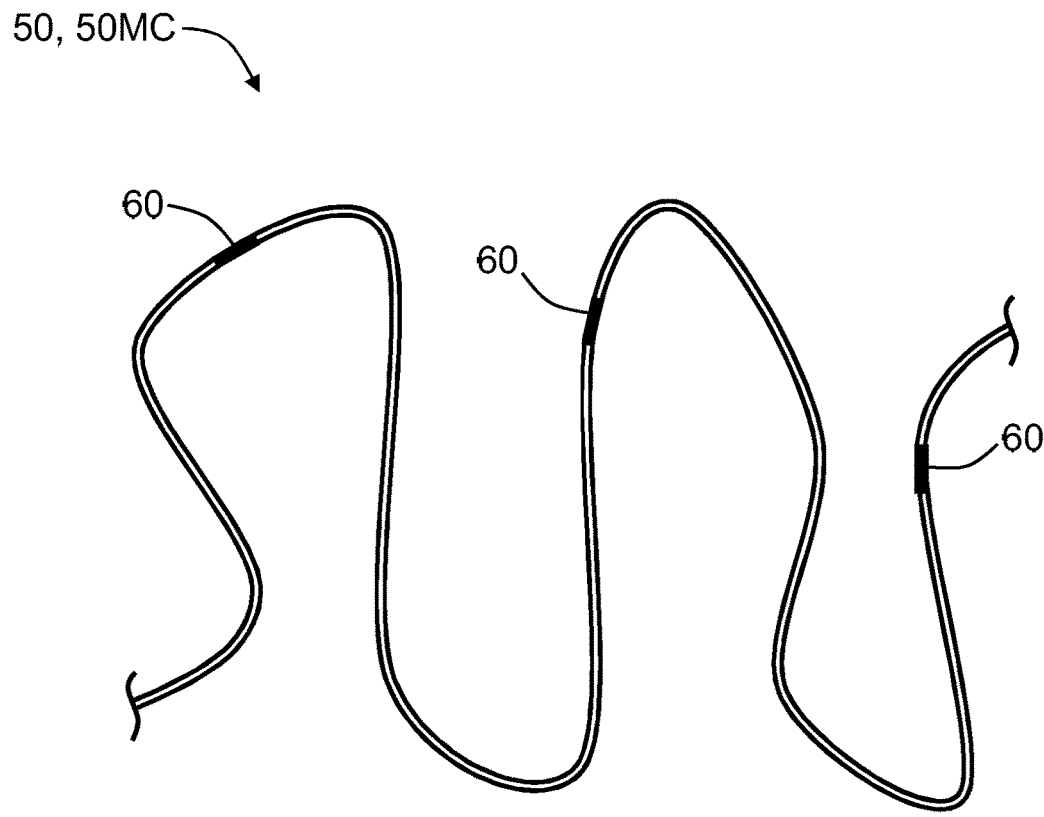
FIG. 7A is a schematic diagram of a section of the marked and coated optical fiber showing the spaced-apart marks.

FIG. 6A is a close-up cross-sectional view of an example of the resulting covered fiber (fiber section 50MC). FIGS. 6B and 6C are cross-sectional views of the covered fiber as taken at an unmarked location b-b and at a marked location c-c. The overcoat 180 has a thickness THC, which in an example is in the range from 3 µm to 8 µm. FIG. 7A is a schematic diagram of a section of the covered fiber (fiber section 50MC) showing the spaced-apart marks 60 as seen through the overcoat 180.

Figure 7B:
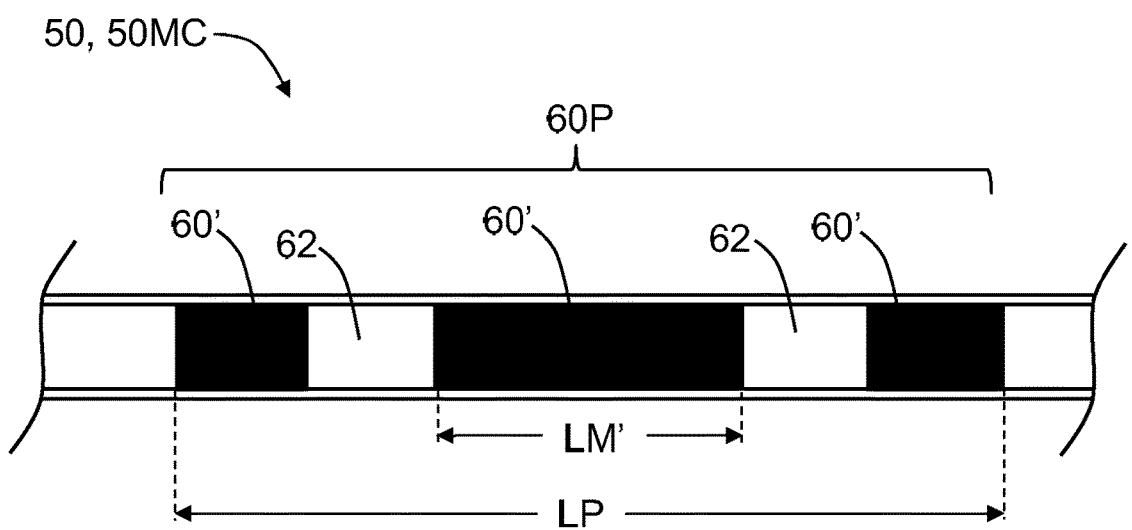
FIG. 7B is a close-up view of a portion of an example marked and coated optical fiber showing an example of a patterned mark comprising closely spaced marks formed over a pattern length.

As noted above, an embodiment of the printer unit 100 can include more than one ink-jet printer head 110. Such an embodiment can be used to form multiple closely spaced marks 60 at the marking location ML. FIG. 7B is a close-up view of an example section of a covered fiber (fiber section 50MC) showing an example of a patterned mark 60P formed over a pattern length LP using an embodiment of the printer unit 100 having multiple ink-jet printer heads 110, such as shown in FIG. 1C. In an example, the different ink-jet printer heads 110 are used to create closely spaced mark segments 60' to define the patterned mark 60P. The mark segments 60' can be the same length or can include one or more different lengths. The patterned mark 60P of FIG. 7B is formed by three distinct (different) mark segments 60' by way of example, with the mark segments 60' separated by small gaps 62. In an example, the pattern length LP can be 20 mm or 15 mm or 10 mm. In an example, $1.5 \cdot LM \geq LP \geq 4 \cdot LM$, while in another example, $LP \approx LM$.

Adjacent patterned marks 60P can be separated by a sufficient spacing LS to distinguish the patterned marks from each other, e.g., LS≥20 mm or 250 mm≥LS≥20 mm. In an example, the operation of the multiple ink-jet printer heads 110 to form the mark segments 60' that define the patterned marks 60P is coordinated by the controller 300. Thus, in an example where patterned marks 60P are formed, in FIG. 7A the marks 60 on the covered fiber (fiber section 50MC) could be shown as patterned marks 60P. In an example, a combination of isolated marks 60 and patterned marks 60P can be used to form the covered fiber. A given patterned mark 60P is considered to be a type of mark 60 that has at least one gap 62 (or equivalently, at least two spaced apart mark segments 60') over the limited pattern length LP. In an example, the mark segments 60' can each have a mark segment length LM' LM.

Figure 8:
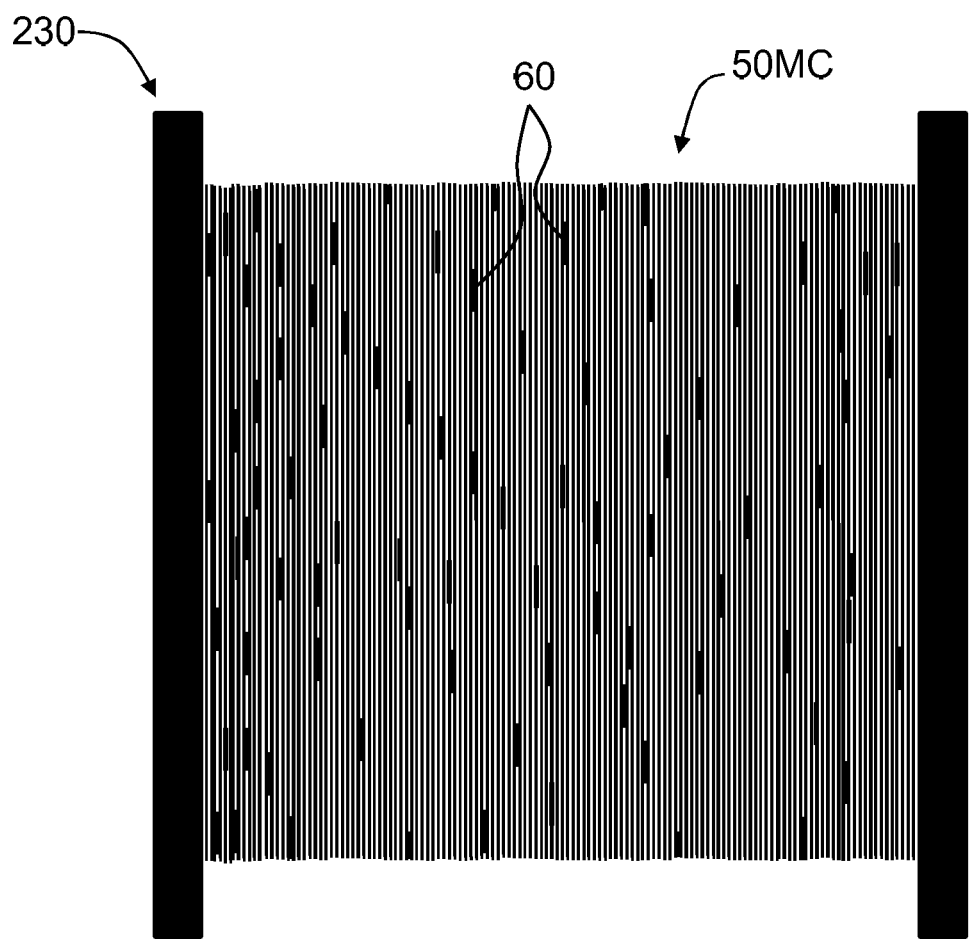
FIG. 8 is a side view based on a photograph of an example marked and coated fiber as wound around a take-up reel, illustrating how the marks are visible when viewing the take-up reel.

With reference again to FIG. 1A, the covered fiber (fiber section 50MC) continues to the take-up module 220 and it taken up by and stored in take-up reel 230. FIG. 8 is a side view of an example of the covered fiber (fiber section 50MC) as wound around a take-up reel 230, illustrating how the marks 60 are visible when the covered fiber is store on the take-up reel 230. This allows for quick identification of the stored covered fiber. FIG. 8 is a simulation of a photograph of an actual take-up reel 230.

Measurements and Experiments

Attenuation measurements were made on covered fibers with various marking lengths LM and marking spacings LS and it was found that for all reasonable markings lengths LM, mark spacings LS and number densities N, any additional attenuation due to the presence of the marks was not significant.

Experiments were also conducted at a high fiber speed of 14 m/s and for a number density of N=4/m, and it was found that the number density N stayed within the range of 3.5 to 4.5 based on an average number of counted marks 60 per meter for two or more meter-long fiber sections 50MC of the fiber. Thus, in an example, quality control of the marks 60 can be maintained by using the mark counter 150 and the controller 300 to count marks 60 and generate an average number density N and comparing the measured average number density $N_M$ to a tolerance on the variation in the number density with respect to a target number density N. In an example, the variation on measured average number density $N_M$ over two or more select lengths of fiber 50 can be no greater than +/−0.5 mark/meter, so that for a target number density of N=4/m, an averaged measured number density in the range between 3.5/m and 4.5/m would be acceptable from a quality control viewpoint.

Aspect 1 of the description is:
A method of marking an optical fiber having an outer surface, comprising:
 moving an optical fiber at a line speed greater than 2 m/s past a printer unit, the printer unit dispensing ink to the outer surface of the optical fiber, the ink contacting the outer surface of the optical fiber at a marking location to form a plurality of ink marks on the optical fiber, the optical fiber having a vibration in a direction that displaces the optical fiber away from the marking location; and
 damping the vibration of the optical fiber, the damping including controlling the vibration to have a peak-to-peak displacement less than 40 μm.

Aspect 2 of the description is:
The method according to Aspect 1, wherein the printer unit comprises at least one ink-jet printer head that performs said dispensing of the ink.

Aspect 3 of the description is:
The method according to Aspect 1 or 2, wherein at least one of the ink marks comprises a patterned ink mark.

Aspect 4 of the description is:
The method according to any of Aspects 1-3, wherein the damping of the undamped vibration comprises operably disposing a first vibration damper immediately upstream of the printer unit, wherein the first vibration damper includes first and second guide members having respective outer surfaces that contact opposite sides of the optical fiber.

Aspect 5 of the description is:
The method according to Aspect 4, wherein the damping of the undamped vibration further comprises operably disposing a second vibration damper downstream of the printer unit, wherein the second vibration damper also includes first and second guide members having respective outer surfaces that contact opposite sides of the optical fiber.

Aspect 6 of the description is:
The method according to any of Aspects 1-5, wherein the plurality of ink marks comprises wet ink marks, the method further comprising drying the wet ink marks.

Aspect 7 of the description is:
The method according to any of Aspects 1-6, wherein the amount of undamped vibration is greater than 40 μm as measured peak-to-peak.

Aspect 8 of the description is:
The method according to Aspect 7, wherein amount of damped vibration is less than 30 μm as measured peak-to-peak.

Aspect 9 of the description is:
The method according to Aspect 8, wherein amount of damped vibration is less than 20 μm as measured peak-to-peak.

Aspect 10 of the description is:
The method according to Aspect 9, wherein amount of damped vibration is less than 15 μm as measured peak-to-peak.

Aspect 11 of the description is:
The method according to Aspect 10, wherein amount of damped vibration is less than 10 μm as measured peak-to-peak.

Aspect 12 of the description is:
The method according to any of Aspects 1-11, wherein the method is carried out in an optical fiber marking apparatus, and further comprising:
 measuring a number density of the ink marks per unit length;
 comparing the measured number density to a number density tolerance; and
 making at least one adjustment to the optical fiber marking apparatus if the measured number density is outside of the number density tolerance.

Aspect 13 of the description is:
The method according to Aspect 12, wherein the number density of the ink marks per unit length is between 3 and 7 per meter.

Aspect 14 of the description is:
The method according to any of Aspects 1-12, wherein each ink mark has a thickness in the range from 350 nm to 800 nm.

Aspect 15 of the description is:
The method according to any of Aspects 1-14, wherein each ink mark has an axial length of between 1 mm and 5 mm.

Aspect 16 of the description is:
The method according to any of Aspects 1-15, wherein adjacent ink marks have an axial spacing of between 25 mm and 500 mm.

Aspect 17 of the description is:
The method according to any of Aspects 1-16, wherein the optical fiber has a circumference, and wherein each ink mark is in the form of a ring that extends at least 200° around the circumference.

Aspect 18 of the description is:
The method according to any of Aspects 1-17, wherein the ink from the ink-jet printer head is dispensed to the outer surface of the optical fiber in the form of ink droplets having a diameter in the range from 40 µm to 80 µm.

Aspect 19 of the description is:
The method according to any of Aspects 1-18, further comprising forming a substantially transparent protective coating on the optical fiber, the forming the substantially transparent protective coating comprising:
depositing an ultraviolet (UV)-curable coating material on the outer surface of the optical fiber; and
exposing the UV-curable coating with UV light to cure the coating material.

Aspect 20 of the description is:
The method according to Aspect 19, wherein the protective coating has a color.

Aspect 21 of the description is:
The method according to Aspect 19 or 20, wherein the protective coating has a thickness in the range from 3 µm to 8 µm.

Aspect 22 of the description is:
The method according to any of Aspects 1-21, wherein the line speed is greater than 5 m/s.

Aspect 23 of the description is:
The method according to any of Aspects 1-21, wherein the line speed is greater than 10 m/s.

Aspect 24 of the description is:
A method of marking an optical fiber, comprising:
causing the optical fiber to move over a fiber path, wherein the moving optical fiber has an outer surface and an amount of undamped vibration in the absence of vibration damping;
performing vibration damping by passing the moving optical fiber through at least a first vibration damper respectively operably disposed in the fiber path adjacent an ink-jet printer head and configured to physically contact the optical fiber to provide, substantially at the ink-jet printer head, an amount of damped vibration that is smaller than the amount of undamped vibration and that is within a vibration tolerance;
printing on the moving optical fiber a select number density of ink marks per unit length on the outer surface of the optical fiber with ink from the ink-jet printer head;
drying the ink marks at a drying location to form dried ink marks; and
applying a substantially transparent protective coating over the dried ink marks and the outer surface of the moving optical fiber, wherein the dried ink marks are visible through the substantially transparent protective coating.

Aspect 25 of the description is:
The method according to Aspect 24, wherein the first vibration damper resides immediately upstream of the ink-jet printer head.

Aspect 26 of the description is:
The method according to Aspect 24 or 25, further comprising passing the optical fiber through a second vibration damper that resides downstream of the drying location.

Aspect 27 of the description is:
The method according to any of Aspects 24-26, wherein the amount of undamped vibration is greater than 40 µm as measured peak-to-peak, and wherein the amount of damped vibration is less than 30 µm as measured peak-to-peak.

Aspect 28 of the description is:
The method according to Aspect 27, wherein amount of damped vibration is less than 20 µm as measured peak-to-peak.

Aspect 29 of the description is:
The method according to Aspect 28, wherein amount of damped vibration is less than 15 µm as measured peak-to-peak.

Aspect 30 of the description is:
The method according to Aspect 29, wherein amount of damped vibration is less than 10 µm as measured peak-to-peak.

Aspect 31 of the description is:
The method according to any of Aspects 24-30, wherein the at least first vibration damper comprises first and second spaced apart guide members that define a guide member gap through which the optical fiber passes, with the guide members having respective outer surfaces that contact opposite sides of the optical fiber.

Aspect 32 of the description is:
The method according to any of Aspects 24-31, wherein the method is a carried out in an optical fiber marking apparatus, and further comprising:
measuring a number density of the ink marks or the dried ink marks per unit length;
comparing the measured number density to a number density tolerance; and
making at least one adjustment to the optical fiber marking apparatus if the measured number density is outside of the number density tolerance.

Aspect 33 of the description is:
The method according to any of Aspects 24-32, wherein each ink mark has a thickness in the range from 350 nm to 800 nm.

Aspect 34 of the description is:
The method according to any of Aspects 24-33, wherein the protective coating has a thickness in the range from 3 µm to 8 µm.

Aspect 35 of the description is:
The method according to any of Aspects 24-34, wherein the ink from the ink-jet printer head is dispensed to the outer surface of the optical fiber in the form of ink droplets having a diameter in the range from 40 µm and 80 µm.

Aspect 36 of the description is:
The method according to any of Aspects 24-35, wherein each ink mark has an axial length of between 1 mm and 5 mm, and wherein adjacent ink marks have an axial spacing of between 25 mm and 500 mm.

Aspect 37 of the description is:
The method according to any of Aspects 24-36, wherein each ink mark comprises a patterned ink mark.

Aspect 38 of the description is:
The method according to any of Aspects 24-37, wherein the optical fiber has a circumference, and wherein each ink mark is in the form of a ring that extends at least 200° around the circumference.

Aspect 39 of the description is:
A high-speed optical fiber marking apparatus for marking an optical fiber having an outside surface, comprising relative to a fiber path:
a payout module and a take-up module respectively configured to pay out and take up the optical fiber while moving the optical fiber over the fiber path at a fiber speed that gives rise to an amount of undamped fiber vibration that exceeds a fiber vibration tolerance at a marking location in the absence of vibration damping;

a printer unit disposed downstream of the payout module and at the marking location, the printer unit configured to dispense ink to form ink marks on the outside surface of the moving optical fiber;

a position sensor disposed downstream of the printer unit and configured to measure an amount of vibration in the optical fiber in a vicinity of the printer unit;

a dryer unit disposed downstream of the position sensor at a drying location and configured to dry the ink marks to form dried ink marks;

a coating system disposed downstream of the drying location and configured to coat the outer surface and the dried ink marks; and at least one vibration damper operably disposed in the fiber path and configured to perform vibration damping that reduces the amount of undamped fiber vibration to an amount of damped fiber vibration that is less than the fiber vibration tolerance.

Aspect 40 of the description is:
The apparatus according to Aspect 39, wherein the printer unit comprises at least one ink-jet printer head configured to dispense the ink.

Aspect 41 of the description is:
The apparatus according to Aspect 39 or 40, wherein the fiber speed is in excess of 10 meters per second.

Aspect 42 of the description is:
The apparatus according to any of Aspects 39-41, wherein the optical fiber has opposite sides, and wherein at least one vibration damper comprises first and second spaced apart guide members that define a guide member gap through which the optical fiber passes, with the guide members having respective outer surfaces that contact the opposite sides of the optical fiber.

Aspect 43 of the description is:
The apparatus according to Aspect 42, wherein the at least first vibration damper resides immediately adjacent the ink-jet printer head, and further comprising a second vibration damper operably disposed immediately adjacent and downstream of the dryer unit.

Aspect 44 of the description is:
The apparatus according to Aspect 43, wherein the second vibration damper also includes first and second spaced apart guide members that define a guide member gap through which the optical fiber passes, with the guide members having respective outer surfaces that contact the opposite sides of the optical fiber.

Aspect 45 of the description is:
The apparatus according to any of Aspects 39-44, further comprising a marking counter disposed along the fiber path and configured to count a number density of the ink marks per unit length.

Aspect 46 of the description is:
The apparatus according to any of Aspects 39-45, wherein the ink marks are formed to have a number density of the ink marks per unit length of between 3 and 7 per meter and with a thickness in the range from 350 nm to 800 nm.

Aspect 47 of the description is:
The apparatus according to any of Aspects 39-46, wherein the optical fiber has a circumference, and wherein each ink mark is in the form of a ring that extends at least 200° around the circumference.

Aspect 48 of the description is:
The apparatus according to any of Aspects 39-47, wherein printer unit dispenses the ink in the form of ink droplets having a diameter in the range from 40 μm and 80 μm.

Aspect 49 of the description is:
The apparatus according to any of Aspects 39-48, wherein the amount of undamped vibration is greater than 40 μm as measured peak-to-peak, and wherein the amount of damped vibration is less than 30 μm as measured peak-to-peak.

Aspect 50 of the description is:
The apparatus according to any of Aspects 39-49, wherein amount of damped vibration is less than 20 μm as measured peak-to-peak.

Aspect 51 of the description is:
The apparatus according to Aspect 50, wherein amount of damped vibration is less than 15 μm as measured peak-to-peak.

Aspect 52 of the description is:
The apparatus according to Aspect 51, wherein amount of damped vibration is less than 10 μm as measured peak-to-peak.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of marking an optical fiber having an outer surface, comprising:
    moving an optical fiber at a line speed greater than 2 m/s past a printer unit, the printer unit dispensing ink to the outer surface of the optical fiber, the ink contacting the outer surface of the optical fiber at a marking location to form a plurality of ink marks on the optical fiber, the optical fiber having a vibration in a direction that displaces the optical fiber away from the marking location; and
    damping the vibration of the optical fiber, the damping including controlling the vibration to have a peak-to-peak displacement less than 40 μm.

2. The method according to claim 1, wherein the damping of the undamped vibration comprises operably disposing a first vibration damper immediately upstream of the printer unit, wherein the first vibration damper includes first and second guide members having respective outer surfaces that contact opposite sides of the optical fiber.

3. The method according to claim 2, wherein the damping of the undamped vibration further comprises operably disposing a second vibration damper downstream of the printer unit, wherein the second vibration damper also includes first and second guide members having respective outer surfaces that contact opposite sides of the optical fiber.

4. The method according to claim 3, wherein the plurality of ink marks comprises wet ink marks, the method further comprising drying the wet ink marks.

5. The method according to claim 1, wherein the amount of undamped vibration is greater than 40 μm as measured peak-to-peak and the amount of damped vibration is less than 30 μm as measured peak-to-peak.

6. The method according to claim 1, wherein the method is carried out in an optical fiber marking apparatus, and further comprising:
    measuring a number density of the ink marks per unit length;
    comparing the measured number density to a number density tolerance; and
    making at least one adjustment to the optical fiber marking apparatus if the measured number density is outside of the number density tolerance.

7. The method according to claim 1, wherein each ink mark has an axial length of between 1 mm and 5 mm.

8. The method according to claim 1, wherein adjacent ink marks have an axial spacing of between 25 mm and 500 mm.

9. The method according to claim 1, wherein the optical fiber has a circumference, and wherein each ink mark is in the form of a ring that extends at least 200° around the circumference.

10. The method according to claim 1, wherein the line speed is greater than 5 m/s.

11. A method of marking an optical fiber, comprising:
causing the optical fiber to move over a fiber path, wherein the moving optical fiber has an outer surface and an amount of undamped vibration in the absence of vibration damping;
performing vibration damping by passing the moving optical fiber through at least a first vibration damper respectively operably disposed in the fiber path adjacent an ink-jet printer head and configured to physically contact the optical fiber to provide, substantially at the ink-jet printer head, an amount of damped vibration that is smaller than the amount of undamped vibration and that is within a vibration tolerance;
printing on the moving optical fiber a select number density of ink marks per unit length on the outer surface of the optical fiber with ink from the ink-jet printer head;
drying the ink marks at a drying location to form dried ink marks; and
applying a substantially transparent protective coating over the dried ink marks and the outer surface of the moving optical fiber, wherein the dried ink marks are visible through the substantially transparent protective coating.

12. The method according to claim 11, further comprising passing the optical fiber through a second vibration damper that resides downstream of the drying location.

13. The method according to claim 11, wherein the amount of undamped vibration is greater than 40 μm as measured peak-to-peak, and wherein the amount of damped vibration is less than 30 μm as measured peak-to-peak.

14. The method according to claim 11, wherein the method is a carried out in an optical fiber marking apparatus, and further comprising:
measuring a number density of the ink marks or the dried ink marks per unit length;
comparing the measured number density to a number density tolerance; and
making at least one adjustment to the optical fiber marking apparatus if the measured number density is outside of the number density tolerance.

15. A high-speed optical fiber marking apparatus for marking an optical fiber having an outside surface, comprising relative to a fiber path:
a payout module and a take-up module respectively configured to pay out and take up the optical fiber while moving the optical fiber over the fiber path at a fiber speed that gives rise to an amount of undamped fiber vibration that exceeds a fiber vibration tolerance at a marking location in the absence of vibration damping;
a printer unit disposed downstream of the payout module and at the marking location, the printer unit configured to dispense ink to form ink marks on the outside surface of the moving optical fiber;
a position sensor disposed downstream of the printer unit and configured to measure an amount of vibration in the optical fiber in a vicinity of the printer unit;
a dryer unit disposed downstream of the position sensor at a drying location and configured to dry the ink marks to form dried ink marks;
a coating system disposed downstream of the drying location and configured to coat the outer surface and the dried ink marks; and
at least one vibration damper operably disposed in the fiber path and configured to perform vibration damping that reduces the amount of undamped fiber vibration to an amount of damped fiber vibration that is less than the fiber vibration tolerance.

16. The apparatus according to claim 15, wherein the printer unit comprises at least one ink-jet printer head configured to dispense the ink.

17. The apparatus according to claim 15, wherein the optical fiber has opposite sides, and wherein at least one vibration damper comprises first and second spaced apart guide members that define a guide member gap through which the optical fiber passes, with the guide members having respective outer surfaces that contact the opposite sides of the optical fiber.

18. The apparatus according to claim 17, wherein the at least first vibration damper resides immediately adjacent the ink-jet printer head, and further comprising a second vibration damper operably disposed immediately adjacent and downstream of the dryer unit.

19. The apparatus according to claim 18, wherein the second vibration damper also includes first and second spaced apart guide members that define a guide member gap through which the optical fiber passes, with the guide members having respective outer surfaces that contact the opposite sides of the optical fiber.

20. The apparatus according to claim 15, further comprising a marking counter disposed along the fiber path and configured to count a number density of the ink marks per unit length.

* * * * *